United States Patent [19]
Bush

[11] Patent Number: 6,018,358
[45] Date of Patent: *Jan. 25, 2000

[54] RADIO FREQUENCY LEAKAGE DETECTION SYSTEM FOR CATV SYSTEM

[75] Inventor: Terry W. Bush, Greenwood, Ind.

[73] Assignee: Trilithic, Inc., Indianapolis, Ind.

[ * ] Notice: This patent is subject to a terminal disclaimer.

[21] Appl. No.: 08/690,122

[22] Filed: Jul. 31, 1996

Related U.S. Application Data

[63] Continuation-in-part of application No. 08/257,198, Jun. 9, 1994, Pat. No. 5,608,428.

[51] Int. Cl.$^7$ ........................................................ H04N 7/16
[52] U.S. Cl. ................................ 348/6; 348/192; 455/3.1
[58] Field of Search .................................. 348/4, 5, 6, 12, 348/13, 192, 193; 455/3.1, 6.1; H04N 7/16, 7/173

[56] References Cited

U.S. PATENT DOCUMENTS

| | | |
|---|---|---|
| 3,368,031 | 2/1968 | Eisele . |
| 3,684,823 | 8/1972 | McVoy . |
| 4,072,899 | 2/1978 | Shimp . |
| 4,237,486 | 12/1980 | Shimp . |
| 4,670,789 | 6/1987 | Plume ...................................... 348/180 |
| 5,321,849 | 6/1994 | Lemson . |
| 5,608,428 | 3/1997 | Bush ............................................ 348/6 |

OTHER PUBLICATIONS

Archer S. Taylor, "Characterization of Cable TV Networks as the Transmission Media for Data", IEEE Journal on Selected Areas in Communications, vol. SAC–3, No. 2, Mar. 1985 pp. 255–265.

*Primary Examiner*—Chris Grant
*Attorney, Agent, or Firm*—Barnes & Thornburg

[57] ABSTRACT

A communication circuit comprises sources of program material, carrier frequency signal sources and first modulators for modulating the carrier frequency signal sources with the program material sources. Each of the first modulators has a first input terminal, a second input terminal and a first output terminal. Terminal apparatus for demodulating program material-modulated carrier frequency signals include automatic gain control (AGC) circuits having AGC bandwidths. One of the program material sources is coupled to the first input terminal of a respective first modulator through a second modulator having a third input terminal, a fourth input terminal and a second output terminal. A source of signals having a frequency in the AGC bandwidth is coupled to the third input terminal. The source of program material is coupled to the fourth input terminal. The second output terminal to the first input terminal.

22 Claims, 7 Drawing Sheets

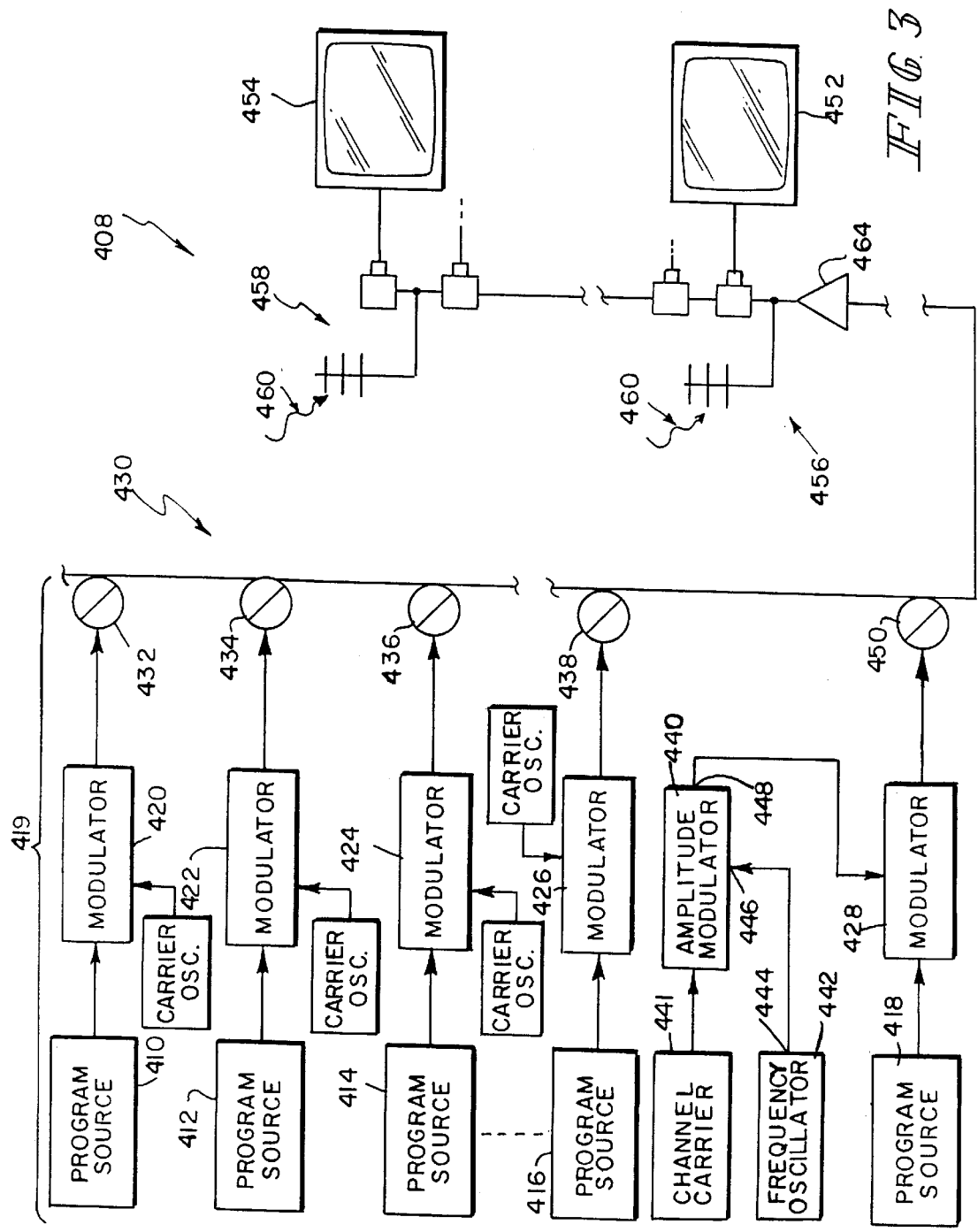

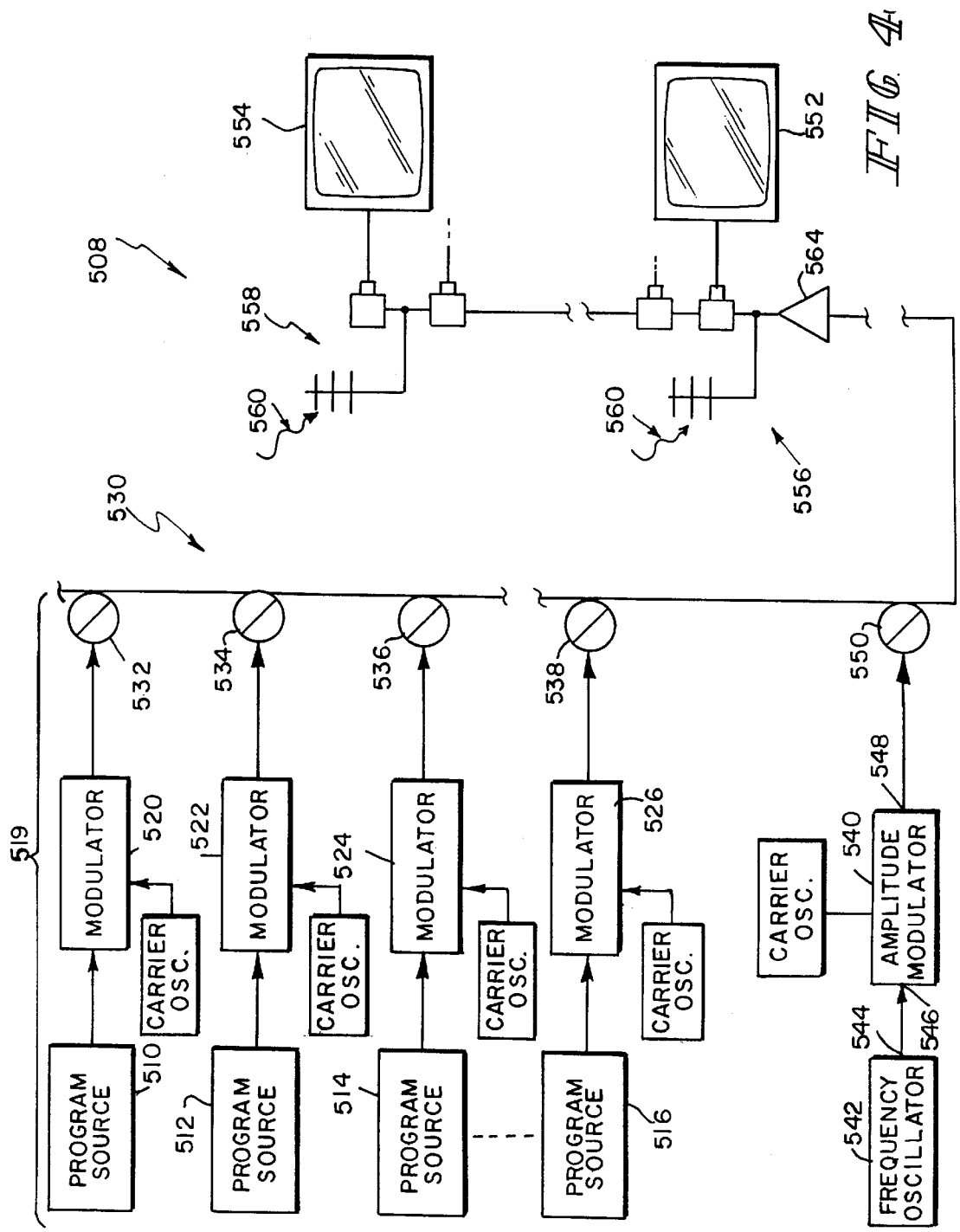

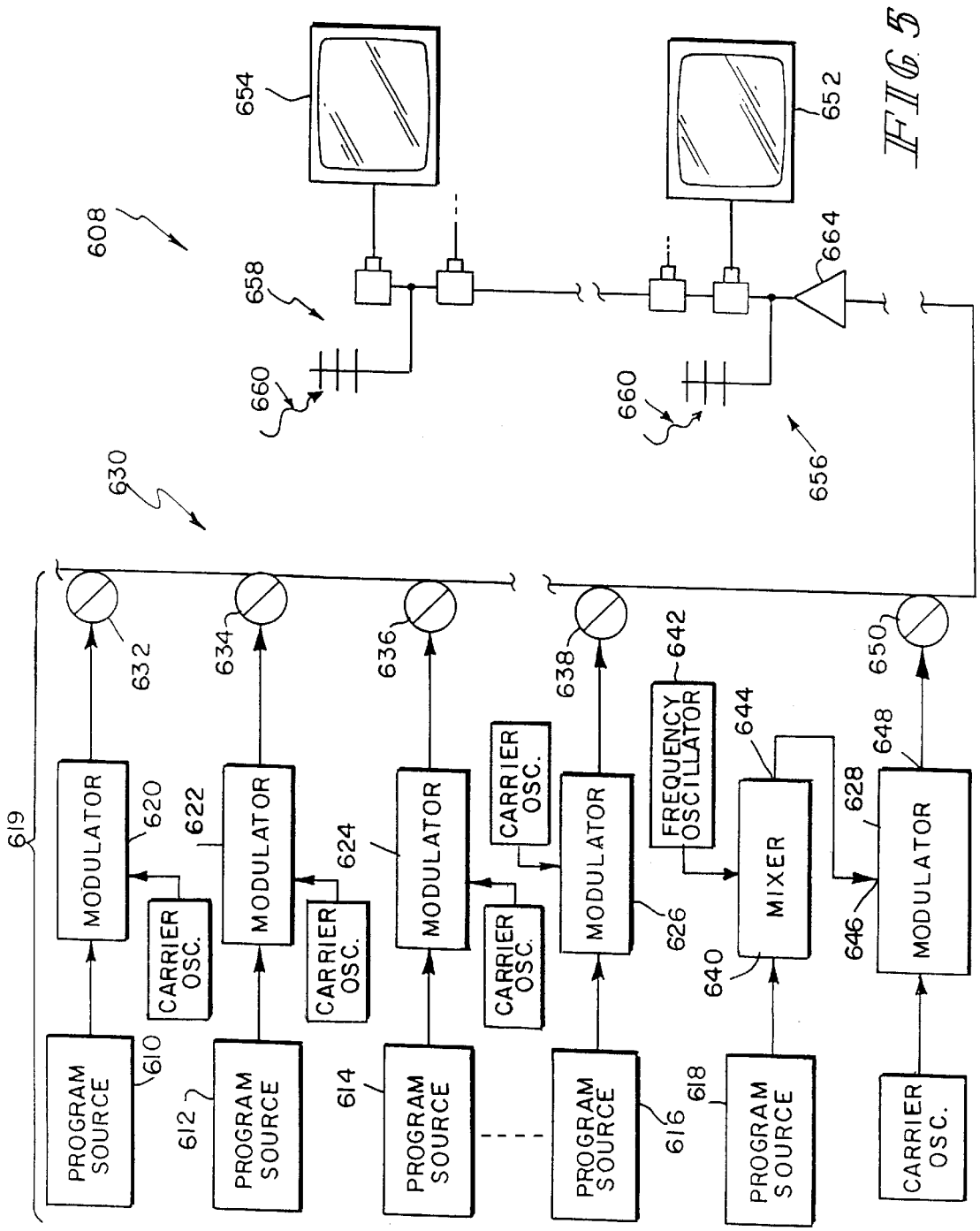

RADIO FREQUENCY LEAKAGE DETECTION SYSTEM FOR CATV SYSTEM

This application is a continuation-in-part of U.S. Ser. No. 08/257,198 filed Jun. 9, 1994, now U.S. Pat. No. 5,608,428 title RADIO FREQUENCY LEAKAGE DETECTION SYSTEM FOR CATV SYSTEM, which is assigned to the same assignee as this application.

This invention relates to the detection of electromagnetic radiation leakage, either egress from or ingress into communication circuits. It is disclosed in the context of detecting leaks in CATV systems, but it is believed to be useful in other applications as well.

Leaks in CATV circuits typically serve both as radiators for the egress of RF energy from the CATV system and as receivers for the ingress of RF energy into the system. Thus it is important to identify and locate such leaks, not only because the RF energy which would otherwise be available to subscribers can escape the circuit, but also because RF signals of all kinds of extraneous sources such as broadcast, two-way radio and so on are constantly impinging upon the circuit, and thus can affect transmission through the circuit. Even assuming uniform field strength along the circuit from such an extraneous source, substantially different effects can be witnessed by subscribers. For example, subscribers closer to the head end of the circuit or an intervening amplifier will have relatively higher circuit signal-to-leakage noise ratios. Their receivers ordinarily will experience less difficulty recovering the program material from the circuit channels to which their receivers are tuned. As one moves further from the head end of the circuit or from any intervening repeater amplifier, however, the attenuation of the signals on the circuit increases. At some distance from the head end or the intervening repeater, the circuit signal-to-leakage noise ratio becomes sufficiently small that it may become impossible to recover the program material on the circuit channel from the ingressing leakage.

On the egressing leakage side, where there is no overbuilding, that is, where there are not multiple CATV systems lying closely adjacent each other, it may not be a problem for prior art leak detectors to detect egressing RF energy, and identify its location so that repairs can be effected. However, where multiple CATV systems are overbuilt, the source of an RF leak cannot ordinarily be ascertained even though an RF leak is detected unless each system is carrying a unique carrier. In the prior art, U.S. Pat. No. 4,072,899 solved this problem by placing on a particular circuit a carrier modulated by a unique audio tone. Detection of the unique audio tone meant that the leak had been isolated to that particular circuit. However, the carrier modulated by the unique audio tone occupied circuit bandwidth which otherwise could be occupied by a carrier modulated by program material.

Additionally, the sensitivity of such prior art systems to low leakage levels has not proven to be great enough to detect leaks that would affect certain kinds of circuit communications. For example, it is not believed that such prior art RF leakage detection schemes are sufficiently sensitive to detect leaks in 64 quadrature amplitude modulated (64 QAM) compressed digital transmission circuits to avoid disastrous disruptions, for example, loss of image for up to fifty percent of the time, resulting from low level RF leakage ingress into such circuits.

The system of the present invention is sensitive enough for such RF leak detection schemes and applications. With the present invention, revenue generating circuit bandwidth does not have to be employed to tag a particular circuit with a circuit identifier. The increased system sensitivity of the present invention means that the CATV circuit operator either can place a much lower power level tag on his circuit or, alternatively, can detect lower level leaks or detect leaks from much greater distances from the circuit than with prior art systems.

According to one aspect of the invention, a communication circuit comprises at least one source of program material, at least one carrier frequency signal source and at least one first modulator for modulating the at least one carrier frequency signal source with the at least one program material source. The at least one first modulator has a first input terminal, a second input terminal and a first output terminal. At least one terminal apparatus is provided for demodulating program material-modulated carrier frequency signals. The at least one terminal apparatus includes automatic gain control (AGC) means having an AGC bandwidth. At least one first means is provided for coupling the at least one program material source to the at least one first input terminal. At least one second means is provided for coupling the at least one carrier frequency signal source to the at least one second input terminal. At least one third means is provided for coupling the at least one first output terminal to the at least one terminal apparatus. One of the at least one first, second and third coupling means comprises a second modulator having a third input terminal, a fourth input terminal and a second output terminal, a source of signals having a frequency in the AGC bandwidth, means for coupling the source of signals in the AGC bandwidth to the third input terminal, means for coupling one of the at least one source of program material, the at least one carrier frequency signal source and the at least one first output to the fourth input terminal, and means for coupling the second output terminal to one of the first input terminal, the second input terminal, and the terminal apparatus.

Illustratively, according to this aspect of the invention, the at least one first means comprises means for coupling the at least one source of program material to the fourth input terminal, and means for coupling the second output terminal to the first input terminal.

Alternatively, illustratively, the at least one second means comprises means for coupling the at least one carrier frequency signal source to the fourth input terminal, and means for coupling the second output terminal to the second input terminal.

Alternatively, illustratively, the at least one third means comprises means for coupling the at least one first output to the fourth input terminal, and means for coupling the second output terminal to the terminal apparatus.

According to illustrative embodiments of this aspect of the invention, the source of signals having a frequency in the AGC bandwidth comprises an oscillator having an output signal frequency less than about 35 Hz.

Illustratively, the oscillator output signal frequency is in the range of from about 3 Hz to about 15 Hz.

According to this aspect of the invention, the apparatus further comprises a detector for receiving a signal representative of leakage from the communication circuit, for extracting from the signal representative of leakage signals in the AGC bandwidth, and for producing an indication of detection of signals in the AGC bandwidth.

According to another aspect of the invention, a communication method comprises the steps of providing at least one source of program material, at least one carrier frequency signal source, and modulating the at least one carrier frequency signal source with the at least one program material source in at least one first modulator. Program material-modulated carrier frequency signals are demodulated in at least one terminal apparatus. The at least one first modulator is provided with a first input terminal, a second input terminal and a first output terminal. The at least one terminal apparatus is provided with automatic gain control (AGC) means having an AGC bandwidth. The at least one program material source is coupled to the at least one first input terminal through at least one first means. The at least one carrier frequency signal source is coupled to the at least one second input terminal through at least one second means. The at least one first output terminal is coupled to the at least one terminal apparatus through at least one third means. One of the at least one first, second and third coupling means comprises a second modulator. A third input terminal, a fourth input terminal and a second output terminal are all provided on the second modulator. A source of signals having a frequency in the AGC bandwidth is provided. The source of signals in the AGC bandwidth is coupled to the third input terminal. One of the at least one source of program material, the at least one carrier frequency signal source and the at least one first output is coupled to the fourth input terminal. The second output terminal is coupled to one of the first input terminal, the second input terminal, and the terminal apparatus.

Illustratively according to the invention, the step of coupling the at least one program material source to the at least one first input terminal through the at least one first means comprises coupling the at least one source of program material to the fourth input terminal, and coupling the second output terminal to the first input terminal.

Alternatively, illustratively, the step of coupling the at least one carrier frequency signal source to the at least one second input terminal through the at least one second means comprises coupling the at least one carrier frequency signal source to the fourth input terminal, and coupling the second output terminal to the second input terminal.

Alternatively, illustratively, the step of coupling the at least one first output terminal to the at least one terminal apparatus through the at least one third means comprises coupling the at least one first output to the fourth input terminal, and coupling the second output terminal to the terminal apparatus.

According to illustrative embodiments of this aspect of the invention, the step of providing a source of signals having a frequency in the AGC bandwidth comprises providing an oscillator having an output signal frequency less than about 35 Hz.

Illustratively, the oscillator output signal frequency is in the range of from about 3 Hz to about 15 Hz.

According to this aspect of the invention, the method further comprises receiving a signal representative of leakage from the communication circuit, extracting from the signal representative of leakage signals in the AGC bandwidth, and producing an indication of detection of signals in the AGC bandwidth.

According to yet another aspect of the invention, a communication circuit comprises n sources of program material, where n is an integer, n+1 carrier frequency modulators, and n+1 sources of carrier frequency signals. Each of the n program material sources and n of the n+1 carrier frequency signals are coupled to carrier frequency modulators. The n program material sources thereby modulate n of the carrier frequency signals to provide n output signals. Terminal apparatus is provided for recovering the program material selectively from the output signals. The terminal apparatus includes automatic gain control (AGC) means having an AGC bandwidth. An oscillator has a frequency in the AGC bandwidth. The oscillator and the (n+1)st carrier frequency are coupled to the (n+1)st carrier frequency modulator to modulate the (n+1)st carrier frequency by the oscillator frequency. A detector receives a signal representative of leakage of the thus-modulated (n+1)st carrier frequency from the circuit, detects the oscillator output frequency in the received signal, and produces an indication of detection of the oscillator output frequency.

Illustratively according to this aspect of the invention, the oscillator output frequency is less than about 35 Hz.

Illustratively, the oscillator output frequency is in the range of from about 3 Hz to about 15 Hz.

Illustratively, the communication circuit comprises a CATV circuit and the terminal apparatus comprises at least one television receiver.

According to yet another aspect of the invention, in a communication circuit, a method comprises the steps of providing n sources of program material, where n is an integer, n+1 carrier frequency modulators, and n+1 sources of carrier frequency signals. Each of the n program material sources and n of the n+1 carrier frequency signals are coupled to carrier frequency modulators, thereby modulating n of the carrier frequency signals with the n program material sources to provide n output signals. The program material is recovered selectively from the output signals with terminal apparatus including automatic gain control (AGC) means having an AGC bandwidth. An oscillator having a frequency in the AGC bandwidth and the (n+1)st carrier frequency are coupled to the (n+1)st carrier frequency modulator to modulate the (n+1)st carrier frequency by the oscillator frequency. A signal representative of leakage of the thus-modulated (n+1)st carrier frequency is received from the circuit, the oscillator output frequency is detected in the received signal, and an indication of detection of the oscillator output frequency is produced.

Illustratively according to this aspect of the invention, the oscillator has a frequency less than about 35 Hz.

Illustratively, the oscillator has a frequency in the range of from about 3 Hz to about 15 Hz.

Illustratively according to this aspect of the invention, recovering the program material selectively from the output signals with terminal apparatus including AGC means comprises recovering the program material with at least one television receiver.

The invention may best be understood by referring to the following description and accompanying drawings which illustrate the invention. In the drawings:

FIG. 1 illustrates a block diagram of a CATV system constructed according to the present invention;

FIG. 2a–c illustrate in schematic form an RF leak detector constructed according to the present invention;

FIG. 3 illustrates a block diagram of a CATV system constructed according to the present invention;

FIG. 4 illustrates a block diagram of a CATV system constructed according to the present invention; and FIG. 5 illustrates a block diagram of a CATV system constructed according to the present invention.

The following schematic and block circuit diagram descriptions identify specific integrated circuits and other components and in many cases specific sources for these. Specific terminal and pin names and numbers are generally given in connection with these for the purposes of completeness. It is to be understood that these terminal and pin identifiers are provided for these specifically identified components. It is to be understood that this does not constitute a representation, nor should any such representation be inferred, that the specific components or sources are the only components available from the same or any other sources capable of performing the necessary functions. It is further to be understood that other suitable components available from the same or different sources may not use the same terminal/pin identifiers as those provided in this description.

Figure 1:
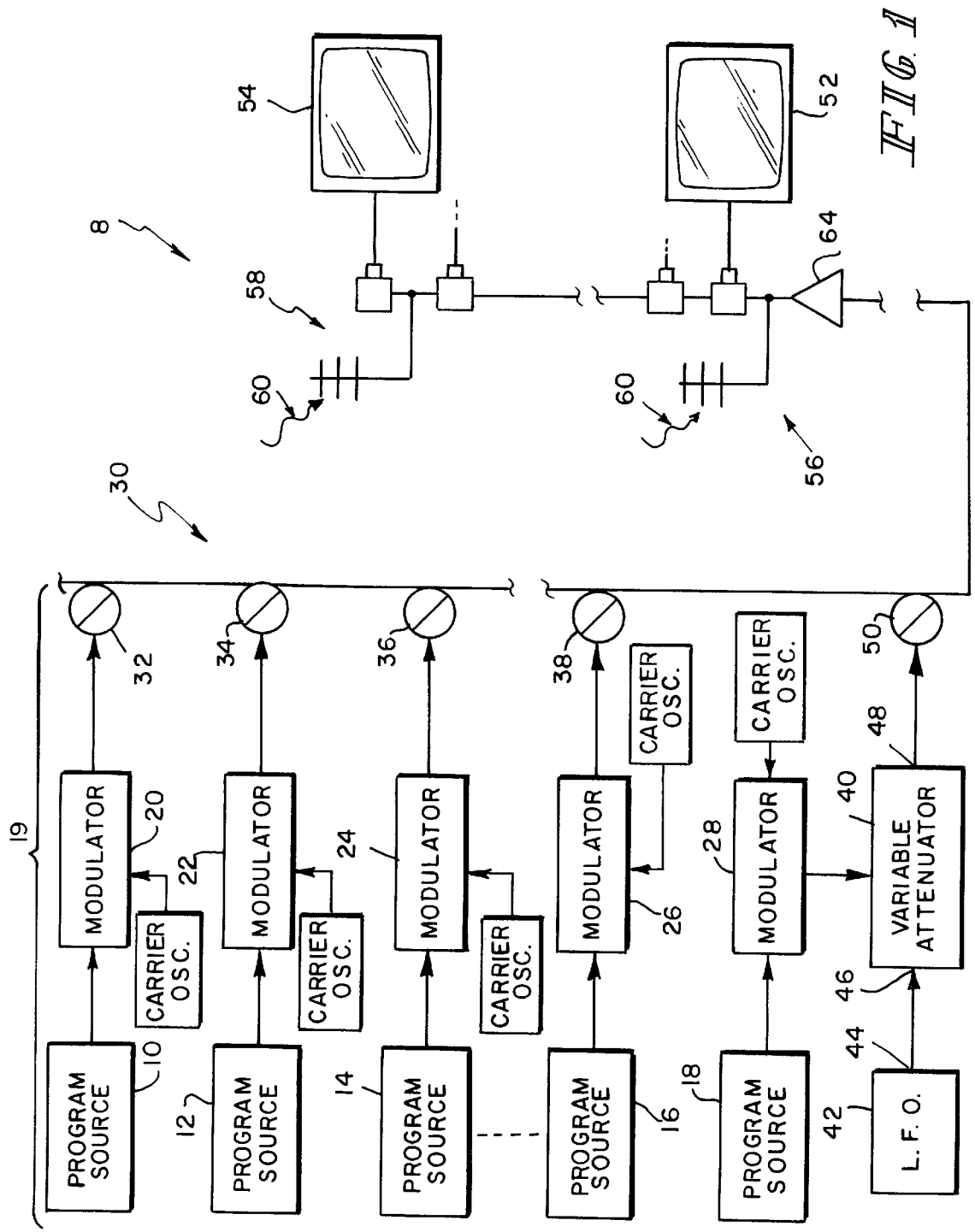

A CATV system 8 according to the present invention is illustrated in highly schematic block diagram form in FIG. 1. Several program sources 10, 12, 14, . . . 16, 18 such as satellite links, VCR's and the like at a head end 19 of the CATV system 8 are coupled to input ports of respective modulators 20, 22, 24, . . . 26, 28. The modulators modulate the source signals into channels for placement on a CATV circuit 30. The output ports of channel modulators 20, 22, 24, . . . 26 are coupled through respective power couplers 32, 34, 36, . . . 38 to circuit 30. The output port of an arbitrary one, 28, of the channel modulators, however, is coupled to an input port of a variable attenuator, or amplitude modulator, 40. A low (here, subsonic) frequency oscillator 42 has an output port 44 on which appears a subsonic frequency signal in the range of, for example, 3 Hz–10 Hz. This signal is coupled from port 44 to a control input port 46 of amplitude modulator 40.

An output port 48 of amplitude modulator 40 is coupled through a power coupler 50 to circuit 30. In this way, the subsonic frequency signal from oscillator 42 is placed on circuit 30 without occupying otherwise revenue-producing bandwidth of the circuit. The percentage modulation produced by amplitude modulator 40 in the output signal from modulator 28 is very low, typically under 20%, which results in only about 2 dB or so of modulation of the source 18 signal applied to circuit 30. Because the modulating frequency is so low, and particularly because that frequency is well within the automatic gain control (AGC) bandwidth of all of the television receivers of subscribers 52, . . . 54 along circuit 30, that frequency is not detectable in the programs reproduced on receivers 52, . . . 54.

The detection of the oscillator 42 frequency in circuit 30 can best be understood by first assuming that circuit 30 contains a leak 56, illustrated as an antenna for purposes which will become clear, along its length nearer head end 19 and a leak 58 along its length more remote from head end 19. Leaks 56, 58 typically serve both as radiators for the egress of RF energy from CATV system 8 and as receivers for the ingress of energy into CATV system 8. Thus it is important to identify and locate such leaks 56, 58 not only because the RF energy which would otherwise be available to subscribers 52, . . . 54 can escape the circuit 30 but also because RF signals 60 of all kinds from all kinds of extraneous sources such as broadcast, two-way radio and so on are constantly impinging upon circuit 30. Even assuming that the field strengths at circuit 30 from such extraneous sources are generally the same at all points along the length of circuit 30, substantially different effects can be witnessed by subscribers 52, . . . 54. Subscriber 52, for example, is closer to head end 19 or to an intervening line amplifier, or repeater, 64. Therefore the circuit 30 signal-to-received noise 60 ratio is relatively higher for subscriber 52 and his receiver has relatively less difficulty recovering the program material from the circuit 30 channel 20, 22, 24, . . . 26, 28 to which his receiver is tuned. At subscriber 54's receiver, however, the effect can be quite different, owing to the attenuation of the signals on circuit 30 as distance from the head end 19 or any intervening repeater 64 increases. At some point along this length, the circuit 30 signal-to-received noise 60 ratio becomes sufficiently small that it may become impossible to recover the program material on the circuit 30 channel 20, 22, 24, . . . 26, 28 from the noise 60.

Where there is no overbuilding, that is, where there are not multiple CATV systems lying closely adjacent each other, it may not be a problem for prior art leak detectors to detect leaking RF energy, and identify its location so that repairs can be effected. However, where multiple CATV systems are overbuilt, the source of an RF leak cannot ordinarily be ascertained even though an RF leak is detected. In the prior art, U.S. Pat. No. 4,072,899 solved this problem by placing on the circuit 30 a carrier modulated by a unique audio tone. Detection of the unique audio tone meant that the leak had been isolated to that particular circuit 30. However, the carrier modulated by the unique audio tone took up frequency "space" on the circuit 30 bandwidth which otherwise could be sold, that is occupied by a channel modulated by program material.

Additionally, the sensitivity of such prior art systems to low leakage levels has not proven to be great enough to detect leaks that would affect certain kinds of circuit 30 communications. For example, it is not believed that such prior art circuit 30 RF leakage detection schemes are sufficiently sensitive to detect leaks in 64 quadrature amplitude modulated (64 QAM) compressed digital transmission circuits 30 to avoid disastrous disruptions resulting from low level signal 60 ingress into such circuits 30. The system of the present invention is sensitive enough for such RF leak detection schemes and applications. The increased system sensitivity with the present invention means that the CATV circuit 30 operator can place a much lower power level tag on his circuit 30, or can detect lower power leaks 56, 58, or can detect leaks 56, 58 at much greater distances than with prior art systems. The present invention also means that revenue-generating circuit 30 bandwidth does not have to be employed to tag a particular circuit 30 with a circuit 30 identifier.

Figure 2A:
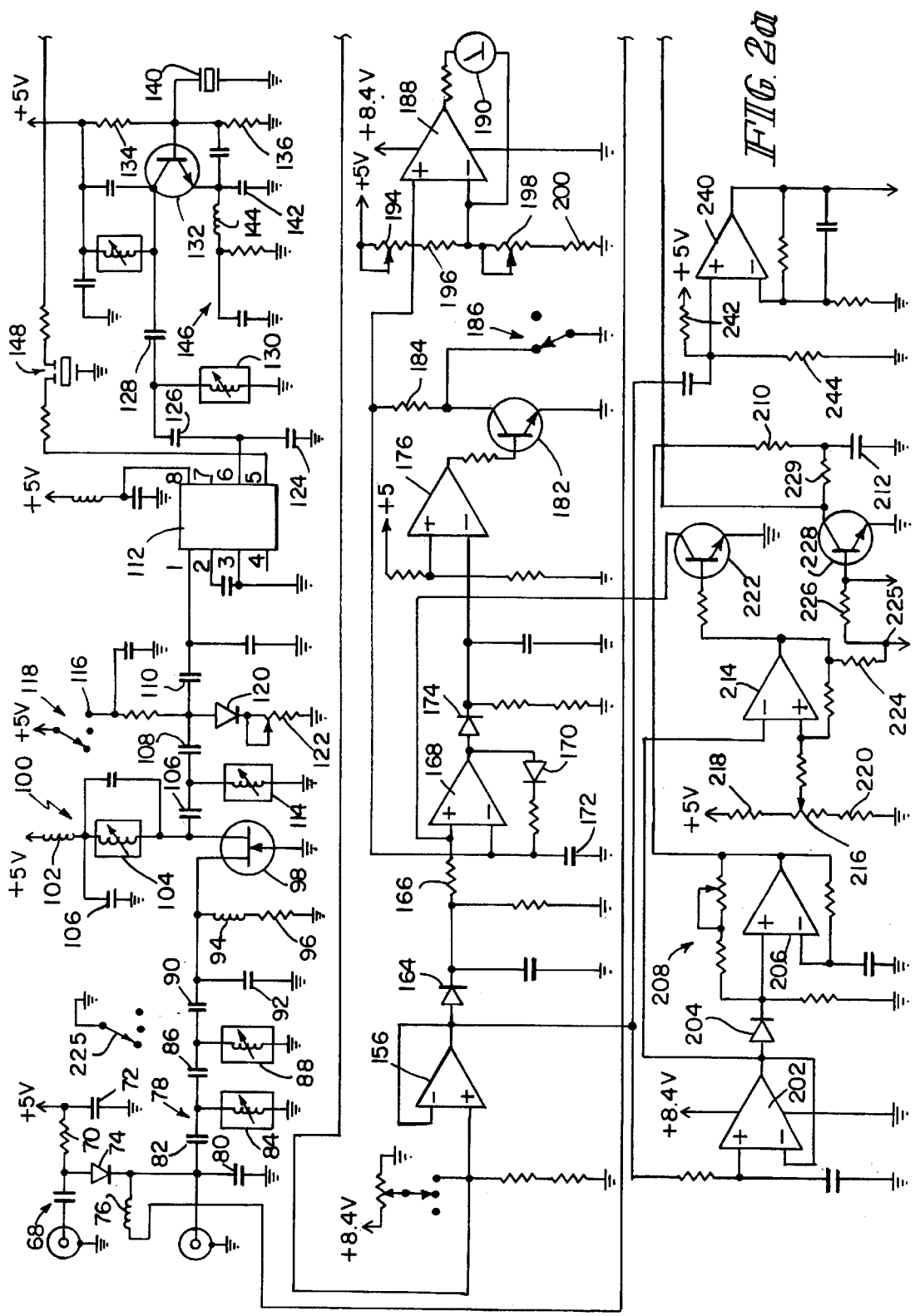
Figure 2B:
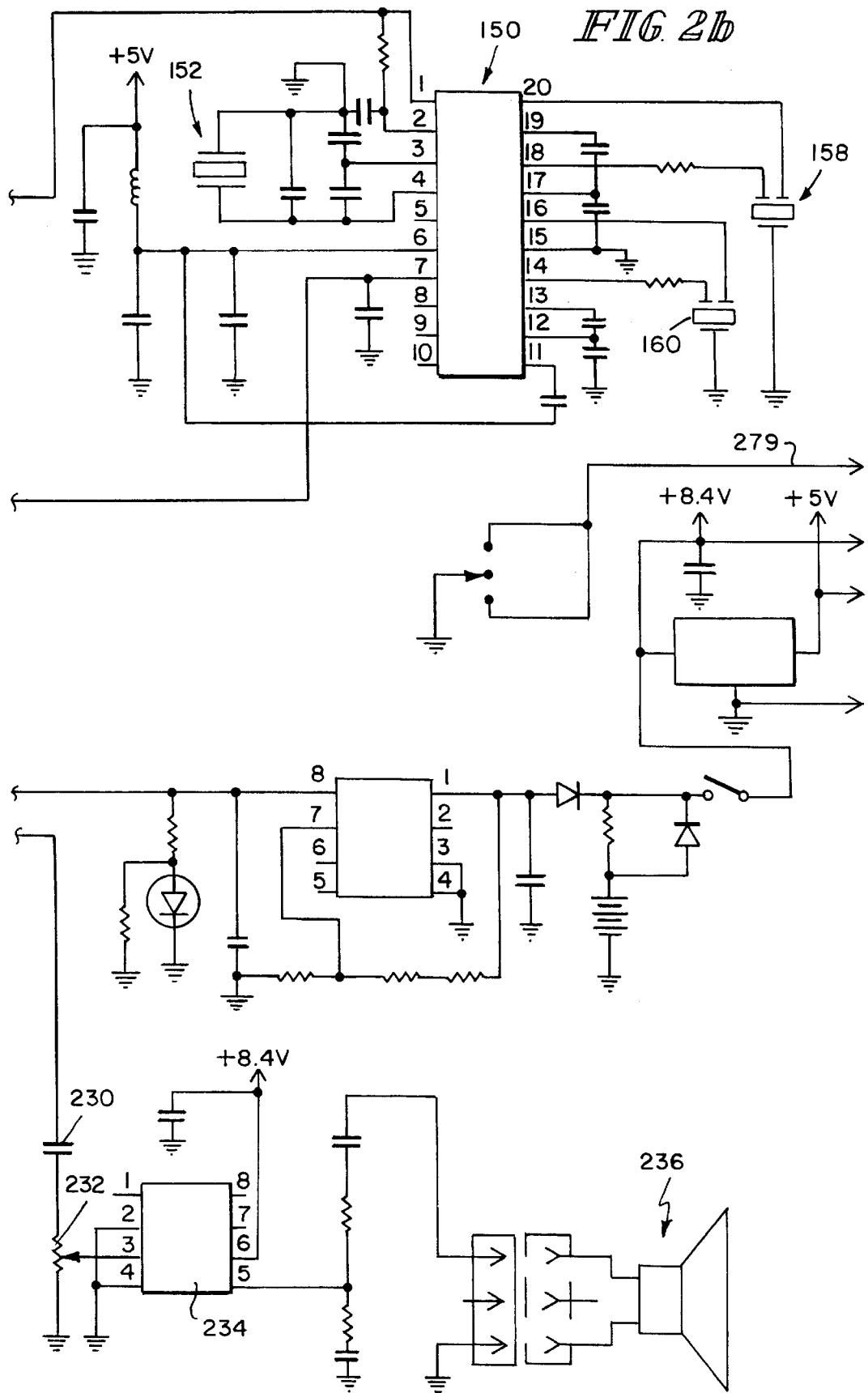
Figure 2C:
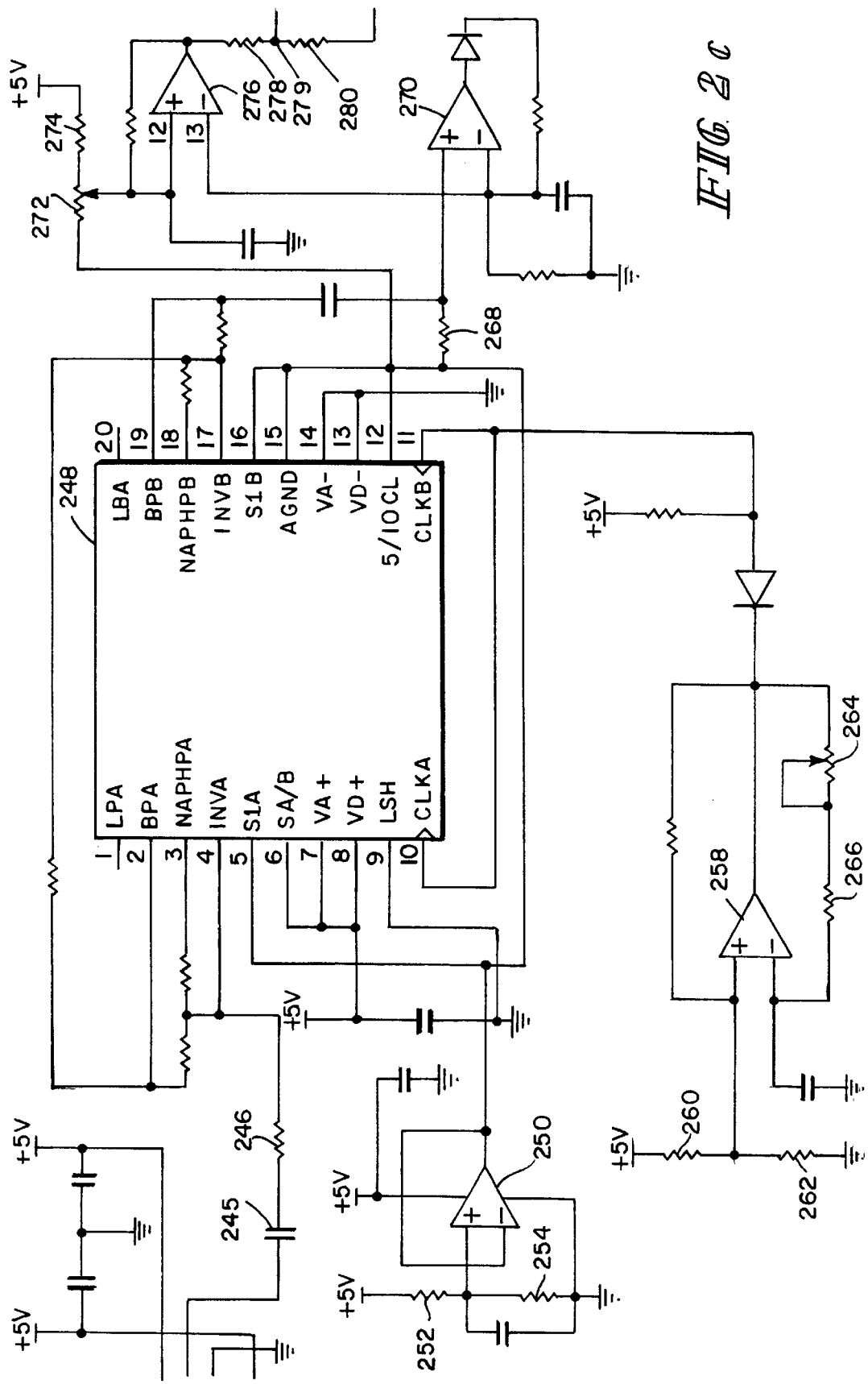

The detection system of the present invention will now be discussed with particular reference to FIGS. 2a–c. FIG. 2a illustrates to a substantial extent a presently commercially available SEARCHER+ leak detector available from Trilithic Inc., 9202 East 33rd Street, Indianapolis, Ind. 46236. Energy is coupled from an RF leak, 58 for example, through a front panel (FP) antenna, a 1000 pF capacitor 68, a 2.2 KΩ resistor 70 and a 0.1 $\mu$F capacitor 72 to the leak detector ground. The common terminal of resistor 70 and capacitor 72 is coupled to +5 VDC supply. The common terminal of capacitor 68 and resistor 70 is coupled to the anode of a type BA682 diode 74. Alternatively, the RF leak energy can be coupled through a rear panel (RP) antenna to the cathode of diode 74. The cathode of diode 74 is coupled to a terminal of a 2.2 $\mu$H inductor 76, and to a multiple section LC filter 78. Filter 78 includes a 27 pF capacitor 80 coupled to ground, a series 4.7 pF capacitor 82 and tunable 7½ turn, 259 nH≦L≦305 nH inductor 84 coupled in parallel with capacitor 80, a series 0.33 pF capacitor 86 and a tunable 7½ turn, 259-to-305 nH inductor 88 coupled in parallel with inductor 84, a series 3.9 pF capacitor 90 and 27 pF capacitor 92 coupled in parallel with inductor 88. A series 2.2 $\mu$H inductor 94 and 180 Ω resistor 96 are coupled in parallel with capacitor 92.

The filter 78 output appearing across capacitor 92 and the series components 94, 96 is applied across the Source and Gate terminals of a type MMBFJ310 JFET 98. The gate of FET 98 is grounded. Its Drain is coupled through a tuned tank circuit 100 to +5 VDC. Circuit 100 includes a 2.2 $\mu$H inductor 102 and a tunable 7½ turn, 259-to-305 nH inductor 104 in series between +5 VDC and the drain terminal of FET 98. A 0.01 $\mu$F capacitor 106 is coupled between the common terminal of inductors 102, 104 and ground. A 1.5 pF capacitor is coupled in parallel with inductor 104. The drain terminal of FET 98 is coupled through series 0.33 pF, 5.6 pF and 1000 pF capacitors 106, 108, 110, respectively, to an input terminal, pin 1, of a Signetics NE602D double-balanced mixer/oscillator integrated circuit 112.

The common terminal of capacitors 106, 108 is coupled through a tunable 7½ turn, 259-to-305 nH inductor 114 to ground. The common terminal of capacitors 108, 110 is coupled through a 1 KΩ resistor to the X10 attenuation terminal 116 of a double pole, three position switch 118. A 1000 pF capacitor is coupled between terminal 116 and ground. The anode of a type BA 682 diode 120 is coupled to the common terminal of capacitors 108, 110. The cathode of diode 120 is coupled through a 50 Ω attenuation-setting potentiometer 122 to ground. A 12 pF capacitor is coupled across pin 1 of mixer IC 112 and ground. A 1000 pF capacitor is coupled across an input terminal, pin 21, of IC 112 and ground. Pin 3 of IC 112 is coupled to ground. The Vcc terminal, pin 8, of IC 112 is coupled through a 2.2 μH inductor to +5 VDC and through a 0.01 μF capacitor to ground. The oscillator terminal, pin 6, of IC 112 is coupled to the common terminal of a 39 pF capacitor 124 and a 5.6 pF capacitor 126. The remaining terminal of capacitor 124 is grounded. The remaining terminal of capacitor 126 is coupled to a terminal of a 0.33 pF capacitor 128 and a terminal of a tunable 7½ turn, 259-to-305 nH inductor 130. The remaining terminal of inductor 130 is coupled to ground. The remaining terminal of capacitor 128 is coupled to the collector of a type MMBT 4124 NPN transistor 132.

The collector of transistor 132 is coupled through a parallel LC filter comprising a 3.9 pF capacitor and a tunable 7½ turn, 259-to-305 nH inductor to +5 VDC. +5 VDC is coupled through a voltage divider including a 10 KΩ resistor 134 and a 4.7 KΩ resistor 136 to ground. The common terminal of resistors 134, 136 is coupled to the base of transistor 132 and to one terminal of a channel 28 frequency crystal 140, the other terminal of which is coupled to ground. A filter on the emitter of transistor 132 includes a 39 pF capacitor 142 to ground, and a 39 pF capacitor providing feedback to the base of transistor 132. A 1 μH inductor 144 is coupled between the emitter of transistor 132 and a parallel RC circuit 146 including a 270 Ω resistor and a 680 pF capacitor. The other terminal of circuit 146 is coupled to ground. The output terminal, pin 5, of mixer IC 112 is coupled through a 560 Ω resistor to an input terminal of a 10.7 MHz IF crystal filter 148. The output terminal of crystal filter 148 is coupled through a 560 Ω resistor to an RF input terminal, pin 1, of a Signetics type SA 605 mixer/FM IF integrated circuit 150.

Pin 2, the RF bypass input of IC 150, is coupled through a 0.01 μF capacitor to ground and through a 3.9 KΩ resistor to pin 1 thereof. A 10.245 MHz crystal 152 is coupled across a crystal oscillator input terminal, pin 4, of IC 150 and ground. A 27 pF capacitor is coupled across crystal 152. Pin 3 of IC 150 is coupled to ground through a 100 pF capacitor, and to pin 4 through a 39 pF capacitor. Pin 6, the Vcc input, of IC 150 is coupled through a 100 μH inductor to +5 VDC and through the parallel combination of a 47 μF capacitor and a 0.1 μF capacitor to ground. The Received Signal Strength Indicator output, pin 7, of IC 150 is coupled to a non-inverting (+) input terminal of a National Semiconductor type LM 324 comparator 156 configured as a non-inverting unity gain buffer. A 0.0047 μF capacitor is coupled across pin 7 and ground. The mixer output terminal, pin 20, of IC 150 is coupled to an input terminal of a 0.455 KHz crystal filter 158. An output terminal of filter 158 is coupled through a 470 Ω resistor to the IF amplifier input terminal, pin 18, of IC 150. The IF amp output terminal, pin 16, of IC 150 is coupled to an input terminal of a 455 KHz crystal filter 160, an output terminal of which is coupled through a 1.8 KΩ resistor to the limiter input terminal, pin 14, of IC 150.

The limiter output terminal, pin 11, of IC 150 is coupled through a 1000 pF capacitor to its Vcc terminal. Pins 17 and 19, the IF amp decoupling terminals, of IC 150 are coupled together through a 0.1 μF capacitor. Pin 17 of IC 150 is also coupled to ground through a 0.1 μF capacitor. Pin 15, the GrouND terminal of IC 150, is coupled to ground. Pins 12 and 13, the limiter decoupler terminals of IC 150, are coupled together through a 0.1 μF capacitor and pin 12 is also coupled to ground through a 0.1 μF capacitor.

The + input terminal of comparator 156 is coupled through 87.6 KΩ resistance to ground. The output terminal of comparator 156 is coupled to the anode of a 1N4148 diode 164, the cathode of which is coupled through a 10 KΩ resistor 166 to the + input terminal of an LM 324 comparator 168 in an envelope detector circuit. A parallel RC circuit including a 10 μF capacitor and a 1 KΩ resistor is coupled across the common terminal of diode 164 and resistor 166 and ground. The output terminal of comparator 168 is coupled to the anode of a 1N4148 diode 170 the cathode of which is coupled through a 1 KΩ resistor to the inverting (−) input terminal of comparator 168. A 10 μF capacitor 172 is coupled between the − input terminal of comparator 168 and ground. The output terminal of comparator 168 is also coupled to the anode of a 1N4148 diode 174, the cathode of which is coupled to the − input terminal of an LM 324 comparator 176. The − input terminal of comparator 176 is also coupled through a parallel RC circuit including 4.4 MΩ resistance and a 0.47 μF capacitor to ground.

A diode 174 compensation threshold is established on the + input terminal of comparator 176 by a resistive 11:1 voltage divider including a 47 KΩ resistor 178 and a 4.7 KΩ resistor 180. The output terminal of comparator 176 is coupled through a 10 KΩ resistor to the base of a type MMBT 3904 NPN transistor 182. The emitter of transistor 182 is grounded. The collector of transistor 182 is coupled through a 470 KΩ load resistor 184 to the − input terminal of comparator 168.

A NORMal-HOLD SPDT switch 186 has its movable contact grounded, its NORMal contact coupled to the collector of transistor 182 and its HOLD contact not connected. In the NORMal position, switch 186 thus slowly discharges capacitor 172 through resistor 184. In the HOLD orientation of switch 186, capacitor 172 can only discharge through resistor 184 and transistor 182. In either event, the envelope signal across capacitor 172 is coupled to the + input terminal of an LM 324 comparator 188, the output terminal of which is coupled through a 1 KΩ resistor to a terminal of a signal strength meter 190. The remaining terminal of meter 190 is coupled to the − input terminal of comparator 188. A series string of a 20 KΩ meter zeroing potentiometer 194, a 6.81 KΩ resistor 196, a 1 KΩ meter gain potentiometer 198, and a 1.87 KΩ, 1% resistor 200 is coupled between +5 VDC and ground. The common terminal of resistor 196 and potentiometer 198 is coupled to the − input terminal of comparator 188.

The output terminal of comparator 156 is also coupled through a 10 KΩ resistor to the + input terminal of an LM 324 comparator 202 in an audio frequency VCO. Comparator 202 is also configured as a unity gain buffer. The + input terminal of comparator 202 is coupled to ground through a 10 pF capacitor. The anode of a 1N4148 diode 204 is coupled to the output terminal of comparator 202. The cathode of diode 204 is coupled to the + input terminal of an LM 324 comparator 206. The output terminal of comparator 206 is coupled through a 22 KΩ resistor to its − input terminal. The − input terminal of comparator 206 is also coupled to ground through a 0.047 μF capacitor. The output terminal of comparator 206 is also coupled through a series 20 KΩ tone potentiometer 208 and 22 KΩ resistor to the + input terminal of comparator 206. A 22 KΩ resistor is coupled between the + input terminal of comparator 206 and ground. The series combination of a 470 Ω resistor 210 and a 0.1 μF capacitor 212 is coupled between the output terminal of comparator 206 and ground.

The output terminal of comparator 202 is also coupled to the − input terminal of an LM 324 comparator 214. The + input terminal of comparator 214 is coupled through a 1 KΩ series resistor to the wiper of a 10 KΩ squelch adjusting potentiometer 216. Potentiometer 216 is coupled in series circuit between a 12 KΩ resistor 218 and a 2.7 KΩ resistor 220 which are coupled between +5 VDC and ground. A 1 MΩ feedback resistor is coupled between the output terminal of comparator 214 and its + input terminal. The output terminal of comparator 214 is coupled through a 10 KΩ resistor to the base of a type MMBT 3904 NPN transistor 222. The emitter of transistor 222 is grounded. The collector of transistor 222 is coupled to the + input terminal of comparator 168.

The output terminal of comparator 214 is also coupled through two series 4.7 KΩ resistors 224, 226 to the base of a type MMBT 3904 transistor 228. The emitter of transistor 228 is grounded. The collector of transistor 228 is coupled through a 100 KΩ resistor 229 to the common terminal of resistor 210 and capacitor 212. The collector of transistor 228 is also coupled through a series 0.1 μF capacitor 230 and 10 KΩ volume control potentiometer 232 to ground. The wiper of potentiometer 232 is coupled to the input terminal, pin 3, of a National Semiconductor type LM 386 audio amplifier 234. Pin 6 of amplifier 234 is coupled to +8.4 VDC supply. Pins 2 and 4 of amplifier 234 are coupled to ground. The output terminal, pin 5, of amplifier 234 is coupled to ground through the series combination of a 10 Ω resistor and a 0.047 μF capacitor, and to one terminal of a speaker 236 through the series combination of a 22 Ω resistor and a 330 μF capacitor. The other terminal of speaker 236 is coupled to ground.

The output terminal of buffer 156 is also coupled through a 1 μF capacitor to the + input terminal of a type LM 324 comparator 240 which is configured as an amplifier. A resistive voltage divider including a 1 MΩ resistor 242 and a 47 KΩ resistor 244 is coupled between +5 VDC and ground. The common terminal of resistors 242 and 244 is coupled to the + input terminal of comparator 240. Feedback is provided from the output terminal of comparator 240 to its − input terminal through a parallel RC circuit including a 100 KΩ resistor and a 0.1 pF capacitor. A 10 KΩ resistor is coupled between the input − terminal of comparator 240 and ground.

The output terminal of comparator 240 is also coupled through a series 10 μF capacitor 245 and 25 KΩ resistor 246 to the $INV_A$ input terminal, pin 4, of a Linear Technology type LTC 1060 switched capacitor filter 248 which functions as a very narrow bandpass filter whose center frequency is tuned to the frequency of oscillator 42. Pin 4 of switched capacitor filter 248 is coupled through a 27 KΩ resistor to the $BP_A$ terminal, pin 2, thereof, and through a 1 KΩ resistor to the $N/AP/HP_A$ terminal, pin 3, thereof. The $S_{A/B}$, $V_A$+ and $V_D$+ terminals, pins 6–8, respectively, of switched capacitor filter 248 are coupled to +5 VDC. The LSh terminal, pin 9, thereof is coupled to ground.

The $S1_A$ and $S1_B$ terminals, pins 5 and 16, respectively, of switched capacitor filter 248 are supplied a +2.5 VDC reference level from a 2.5 V reference source including an LM 324 comparator 250 in unity gain buffer configuration. A voltage divider including 10 KΩ resistors 252, 254 is coupled between +5 VDC and ground. A 1 μF capacitor is coupled across resistor 254. The common terminal of resistors 252, 254 is coupled to the + input terminal of comparator 250. This +2.5 VDC reference level is also provided to the AGrouND and 50/100/HOLD terminals, pins 15 and 12, respectively, of switched capacitor filter 248. The $V_A$− and $V_D$− terminals, pins 14 and 13, respectively, of filter 248 are coupled to ground. The $INV_B$ terminal, pin 17 of filter 248, is coupled through a 1 KΩ resistor to the $N/AP/HP_B$ terminal, pin 18, thereof, through a 27 KΩ resistor to the $BP_B$ terminal, pin 19, thereof, and through a 10 KΩ resistor to the $BP_A$ terminal thereof.

A 1 KHZ oscillator comprising an LM 324 comparator 258 is coupled to the $CLocK_A$ and $CLocK_B$ input terminals, pins 10 and 11, respectively, of switched capacitor filter 248. A series resistive voltage divider comprising two 22 KΩ resistors 260, 262 is coupled between +8.4 VDC and ground. The common terminal of resistors 260, 262 is coupled to the + input terminal of comparator 258. A 22 KΩ feedback resistor is coupled between the output terminal of comparator 258 and its + input terminal. Series 10 KΩ frequency adjusting potentiometer 264 and 4.7 KΩ resistor 266 are coupled between the output terminal of comparator 258 and its − input terminal. A 0.1 μF capacitor is coupled between the − input terminal of comparator 258 and ground. The cathode of a type 1N914 diode is coupled to the output terminal of comparator 258. Its anode is coupled to the $CLK_A$ and $CLK_B$ terminals of filter 248 and through a 10 KΩ pull-down resistor to +5 VDC.

The +2.5 VDC reference established at the output terminal of comparator 250 is coupled through a 100 KΩ resistor 268 to the + input terminal of an LM 324 comparator 270 in a peak detector circuit which converts the output of filter 248 to an equivalent DC level. The $BP_B$ terminal of filter 248 is coupled through a 10 μF capacitor to the + input terminal of comparator 270. The output terminal of comparator 270 is coupled to the anode of a 1N914 diode, the cathode of which is coupled through a 470 Ω resistor to the − input terminal of comparator 270. A parallel RC circuit including a 1 MΩ resistor and a 10 μF capacitor is coupled between the − input terminal of comparator 270 and ground. The +2.5 VDC reference at the output terminal of comparator 250 is also coupled through a series 10 KΩ potentiometer 272, which sets the peak threshold, and 10 KΩ resistor 274 to +5 VDC. The wiper of potentiometer 272 is coupled to the + input terminal of an LM 324 comparator 276. The − input terminal of comparator 276 is coupled to the − input terminal of comparator 270. Comparator 276 is configured to compare the equivalent DC level output of peak detector comparator 270 to a threshold level set by potentiometer 272. Thus the presence of an equivalent DC level indicative of oscillator 42 frequency signal above a certain threshold produces a low level on the output of comparator 276. The output terminal of comparator 276 is coupled to its + input terminal through a 100 KΩ feedback resistor, and through series 4.7 KΩ resistors 278, 280 to the base of transistor 228 in FIG. 2a.

The audio signal generated at the output terminal of comparator 206 appears across resistors 210, 229, capacitor 230 and volume control potentiometer 232. The oscillator 42 frequency is recovered by the switched capacitor filter 248 from the signal coupled to switched capacitor filter 248 through IC 150, comparator 156 and comparator 240. This signal is also applied to VCO 206 and modulates the audio signal appearing across components 210, 229, 230 and 232. This low frequency modulation is readily identifiable in the audio output of speaker 236 and identifies system 8 as the RF leakage source.

Power for the illustrated detector system is provided by a 9 V battery 300 through a switch 302 to a National Semiconductor type 78L05 +5 VDC regulator integrated circuit 304. +8.4 VDC for the detector is taken from the input terminal (pin 8) side of regulator 304. +5 VDC for the detector appears on the output terminal, pin 1, of the regulator 304. A system is also provided for recovering energy from received signals. The remaining terminal of inductor 76 is coupled to an input terminal, pin 8, of a National Semiconductor type LP 2951 voltage regulator integrated circuit 308. Rectified 74 and filtered 76, 80 but otherwise unregulated + VDC is applied to pin 8 of regulator 308. Regulated +5 VDC is provided at the output terminal, pin 1, of regulator 308 through a 1N4148 diode 310 and 22 Ω charging resistor 312 when current is flowing in an LED 314 in the input circuit to regulator 308. A series string of an 82 KΩ resistor 316, a 5.6 KΩ resistor 318 and a 10 KΩ resistor 320 programs regulator 308.

Turning now to FIG. 3, another CATV system 408 according to the present invention is illustrated in highly schematic block diagram form. Several program sources 410, 412, 414, . . . 416, 418 such as satellite links, VCR's and the like at a head end 419 of the CATV system 408 are coupled to input ports of respective modulators 420, 422, 424, . . . 426, 428. The modulators modulate the source signals into channels for placement on a CATV circuit 430. The output ports of channel modulators 420, 422, 424, . . . 426, 428 are coupled through respective power couplers 432, 434, 436, . . . 438, 450 to circuit 430. Before the channel carrier 441 for an arbitrary one 418 of the program sources is modulated by its program 418, however, it is first modulated in an amplitude modulator 440 by a low (here, subsonic) frequency oscillator 442. The channel carrier source 441 is coupled to an input port of a variable attenuator, or amplitude modulator, 440. Low frequency oscillator 442 has an output port 444 on which appears a subsonic frequency signal in the range of, for example, 3 Hz–15 Hz. This signal is coupled from port 444 to a control input port 446 of amplitude modulator 440.

An output port 448 of amplitude modulator 440 is coupled to the channel carrier frequency input port of modulator 428 which otherwise is modulated by the program material provided from source 418 in a conventional manner. In this way, the subsonic frequency signal from oscillator 442 is placed on circuit 430 without occupying otherwise revenue-producing bandwidth of the circuit. The percentage modulation produced by variable attenuator 440 in the output signal from modulator 428 is very low, typically under 20%, which results in only about 2 dB or so of modulation of the source 418 signal applied to circuit 430. Because the modulating frequency is so low, and particularly because that frequency is well within the automatic gain control (AGC) bandwidth of all of the television receivers of subscribers 452, . . . 454 along circuit 430, that frequency is not detectable in the program reproduced on receivers 452, . . . 454.

Again, the detection of the oscillator 442 frequency in circuit 430 can best be understood by first assuming that circuit 430 contains a leak 456, illustrated as an antenna, along its length nearer head end 419 and a leak 458 along its length more remote from head end 419. As previously noted, leaks 456, 458 typically serve both as radiators for the egress of RF energy from CATV system 408 and as receivers for the ingress of energy into CATV system 408. Thus it is important to identify and locate such leaks 456, 458 not only because the RF energy which would otherwise be available to subscribers 452, . . . 454 can escape the circuit 430 but also because RF signals 460 of all kinds from all kinds of extraneous sources such as broadcast, two-way radio and so on are constantly impinging upon circuit 430. Even assuming that the field strengths at circuit 430 from such extraneous sources are generally the same at all points along the length of circuit 430, substantially different effects can be witnessed by subscribers 452, . . . 454. Subscriber 452, for example, is closer to head end 419 or to an intervening line amplifier, or repeater, 464. Therefore the circuit 430 signal-to-received noise 460 ratio is relatively higher for subscriber 452 and his receiver has relatively less difficulty recovering the program material from the circuit 430 channel 420, 422, 424, . . . 426, 428 to which his receiver is tuned. At subscriber 454's receiver, however, the effect can be quite different, owing to the attenuation of the signals on circuit 430 as distance from the head end 419 or any intervening repeater 464 increases. At some point along this length, the circuit 430 signal-to-received noise 460 ratio becomes sufficiently small that it may become impossible to recover the program material on the circuit 430 channel 420, 422, 424, . . . 426, 428 from the noise 460.

Turning now to FIG. 4 another CATV system 508 according to the present invention is illustrated in highly schematic block diagram form. Several program sources 510, 512, 514, . . . 516 such as satellite links, VCR's and the like at a head end 519 of the CATV system 508 are coupled to input ports of respective modulators 520, 522, 524, . . . 526. The modulators modulate the source signals into channels for placement on a CATV circuit 530. The output ports of channel modulators 520, 522, 524, . . . 526 are coupled through respective power couplers 532, 534, 536, . . . 538 to circuit 530. A low (subsonic) frequency oscillator 542 has an output port 544 on which appears a subsonic frequency signal in the range of, for example, 3 Hz–10 Hz. This signal is coupled from port 544 to a control input port 546 of a channel modulator 540.

An output port 548 of channel modulator 540 is coupled through a power coupler 550 to circuit 530. In this way, the subsonic frequency signal from oscillator 542 is placed on circuit 530. The percentage amplitude modulation produced by oscillator 542 in the output signal from modulator 540 is very low, typically under 20%, which results in only about 2 dB or so of modulation of the carrier frequency signal 540 applied to circuit 530. Because the modulating frequency is so low, and particularly because that frequency is well within the automatic gain control (AGC) bandwidth of all of the television receivers of subscribers 552, . . . 554 along circuit 530, that frequency is not detectable in the program reproduced on receivers 552, . . . 554.

The detection of the oscillator 542 frequency in circuit 530 can again be understood by first assuming that circuit 530 contains a leak 556, illustrated as an antenna, along its length nearer head end 519 and a leak 558 along its length more remote from head end 519. Leaks 556, 558 typically serve both as radiators for the egress of RF energy from CATV system 508 and as receivers for the ingress of energy into CATV system 508. Again, it is important to identify and locate such leaks 556, 558 not only because the RF energy which would otherwise be available to subscribers 552, . . . 554 can escape the circuit 530 but also because RF signals 560 from extraneous sources are constantly impinging upon circuit 530. Even assuming that the field strengths at circuit 530 from such extraneous sources are generally the same at all points along the length of circuit 530, substantially different effects can be witnessed by subscribers 552, . . . 554. Subscriber 552, for example, is closer to head end 519 or to an intervening line amplifier, or repeater, 564. Therefore the circuit 530 signal-to-received noise 560 ratio is relatively higher for subscriber 552 and his receiver has relatively less difficulty recovering the program material from the circuit 530 channel 520, 522, 524, . . . 526, 528 to which his receiver is tuned. At subscriber 554's receiver, however, the effect can be quite different, owing to the attenuation of the signals on circuit 530 as distance from the head end 519 or any intervening repeater 564 increases. At some point along this length, the circuit 530 signal-to-received noise 560 ratio becomes sufficiently small that it may become impossible to recover the program material on the circuit 530 channel 520, 522, 524, . . . 526, 528 from the noise 560.

Again, where multiple CATV systems exist essentially side-by-side, the source of an RF leak cannot ordinarily be ascertained even though an RF leak is detected. As previously noted, U.S. Pat. No. 4,072,899 solved this problem by placing on the circuit 530 a carrier modulated by a unique audio tone. Detection of unique audio tone meant that the leak had been isolated to that particular circuit 530. However, the sensitivity of such prior art systems to low leakage levels has not proven to be great enough to detect leaks that would affect certain kinds of circuit 530 communications. For example, it is not believed that such prior art circuit 530 RF leakage detection schemes are sufficiently sensitive to detect leaks in 64 quadrature amplitude modulated (64 QAM) compressed digital transmission circuits 530 to avoid disastrous disruptions resulting from low level signal 560 ingress into such circuits 530. The system of the present invention is sensitive enough for such RF leak detection schemes and applications. The increased system sensitivity with the present invention means that the CATV circuit 530 operator can place a much lower power level tag on his circuit 530, or can detect lower power leaks 556, 558, or can detect leaks 556, 558 at much greater distances than with prior art systems.

A CATV system 608 according to the present invention is illustrated in highly schematic block diagram form in FIG. 5. Several program sources 610, 612, 614, . . . 616, 618 such as satellite links, VCR's and the like at a head end 619 of the CATV system 608 are coupled to input ports of respective modulators 620, 622, 624, . . . 626, 628. The modulators modulate the source signals into channels for placement on a CATV circuit 630. The output ports of channel modulators 620, 622, 624, . . . 626, 628 are coupled through respective power couplers 632, 634, 636, . . . 638, 650 to circuit 630. The output port of an arbitrary one, 618, of the program material sources is coupled to its respective modulator 628 by way of an input port of a mixer 640 where a low (here, subsonic) frequency oscillator 642 adds to it a subsonic frequency signal in the range of, for example, 3 Hz–10 Hz. The thus modified program material signal appearing at the output port 644 of mixer 642 is then supplied to a control input port 646 of channel modulator 628. In this way, the subsonic frequency signal from oscillator 642 is placed on circuit 630 without occupying otherwise revenue-producing bandwidth of the circuit. Because the frequency of oscillator 642 is so low, that frequency is not detectable in the programs reproduced on receivers 652, . . . 654.

The detection of the oscillator 642 frequency in circuit 630 can best be understood by first assuming that circuit 630 contains a leak 656, illustrated as an antenna for purposes which will become clear, along its length nearer head end 619 and a leak 658 along its length more remote from head end 619. Leaks 656, 658 typically serve both as radiators for the egress of RF energy from CATV system 608 and as receivers for the ingress of energy into CATV system 608. Thus it is important to identify and locate such leaks 656, 658 not only because the RF energy which would otherwise be available to subscribers 652, . . . 654 can escape the circuit 630 but also because RF signals 660 of all kinds from all kinds of extraneous sources such as broadcast, two-way radio and so on are constantly impinging upon circuit 630. Even assuming that the field strengths at circuit 630 from such extraneous sources are generally the same at all points along the length of circuit 630, substantially different effects can be witnessed by subscribers 652, . . . 654. Subscriber 652, for example, is closer to head end 619 or to an intervening line amplifier, or repeater, 664. Therefore the circuit 630 signal-to-received noise 660 ratio is relatively higher for subscriber 652 and his receiver has relatively less difficulty recovering the program material from the circuit 630 channel 620, 622, 624, . . . 626, 628 to which his receiver is tuned. At subscriber 654's receiver, however, the effect can be quite different, owing to the attenuation of the signals on circuit 630 as distance from the head end 619 or any intervening repeater 664 increases. At some point along this length, the circuit 630 signal-to-received noise 660 ratio becomes sufficiently small that it may become impossible to recover the program material on the circuit 630 channel 620, 622, 624, . . . 626, 628 from the noise 660.

Where there is no overbuilding, that is, where there are not multiple CATV systems lying closely adjacent each other, it may not be a problem for prior art leak detectors to detect leaking RF energy, and identify its location so that repairs can be effected. However, where multiple CATV systems are overbuilt, the source of an RF leak cannot ordinarily be ascertained even though an RF leak is detected. In the prior art, U.S. Pat. No. 4,072,899 solved this problem by placing on the circuit 630 a carrier modulated by a unique audio tone. Detection of the unique audio tone meant that the leak had been isolated to that particular circuit 630. However, the carrier modulated by the unique audio tone took up frequency "space" on the circuit 630 bandwidth which otherwise could be sold, that is occupied by a channel modulated by program material.

Additionally, the sensitivity of such prior art systems to low leakage levels has not proven to be great enough to detect leaks that would affect certain kinds of circuit 630 communications. For example,, it is not believed that such prior art circuit 630 RF leakage detection schemes are sufficiently sensitive to detect leaks in 64 quadrature amplitude modulated (64 QAM) compressed digital transmission circuits 630 to avoid disastrous disruptions resulting from low level signal 660 ingress into such circuits 630. The system of the present invention is sensitive enough for such RF leak detection schemes and applications. The increased system sensitivity with the present invention means that the CATV circuit 630 operator can place a much lower power level tag on his circuit 630, or can detect lower power leaks 656, 658, or can detect leaks 656, 658 at much greater distances than with prior art systems. The present invention also means that revenue-generating circuit 630 bandwidth does not have to be employed to tag a particular circuit 630 with a circuit 630 identifier.

What is claimed is:

1. A communication circuit comprising at least one source of program material, at least one carrier frequency signal source and at least one first modulator for modulating the at least one carrier frequency signal source with the at least one program material source, the at least one first modulator having a first input terminal, a second input terminal and a first output terminal, and at least one terminal apparatus for demodulating program material-modulated carrier frequency signals, the at least one terminal apparatus including automatic gain control (AGC) means having an AGC bandwidth, at least one first means for coupling the at least one program material source to the at least one first input terminal, at least one second means for coupling the at least one carrier frequency signal source to the at least one second input terminal, and at least one third means for coupling the at least one first output terminal to the at least one terminal apparatus, the at least one first coupling means comprising a second modulator having a third input terminal, a fourth input terminal and a second output terminal, a source of signals having a frequency in the AGC bandwidth, means for coupling the source of signals in the AGC bandwidth to the third input terminal, means for coupling the at least one source of program material to the fourth input terminal, and means for coupling the second output terminal to the first input terminal.

2. A communication circuit comprising at least one source of program material, at least one carrier frequency signal source and at least one first modulator for modulating the at least one carrier frequency signal source with the at least one program material source, the at least one first modulator having a first input terminal, a second input terminal and a first output terminal, and at least one terminal apparatus for demodulating program material-modulated carrier frequency signals, the at least one terminal apparatus including automatic gain control (AGC) means having an AGC bandwidth, at least one first means for coupling the at least one program material source to the at least one first input terminal, at least one second means for coupling the at least one carrier frequency signal source to the at least one second input terminal, and at least one third means for coupling the at least one first output terminal to the at least one terminal apparatus, the at least one second coupling means comprising a second modulator having a third input terminal, a fourth input terminal and a second output terminal, a source of signals having a frequency in the AGC bandwidth, means for coupling the source of signals in the AGC bandwidth to the third input terminal, means for coupling the at least one carrier frequency signal source to the fourth input terminal, and means for coupling the second output terminal to the second input terminal.

3. The apparatus of claim 1 or 2 wherein the source of signals having a frequency in the AGC bandwidth comprises an oscillator having an output signal frequency less than about 35 Hz.

4. The apparatus of claim 3 wherein the oscillator output signal frequency is in the range of from about 3 Hz to about 15 Hz.

5. The apparatus of claim 4 and further comprising a detector for receiving a signal representative of leakage from the communication circuit, for extracting from the signal representative of leakage the oscillator output signal frequency, and for producing an indication of detection of the oscillator output signal frequency.

6. The apparatus of claim 3 and further comprising a detector for receiving a signal representative of leakage from the communication circuit, for extracting from the signal representative of leakage the oscillator output signal frequency, and for producing an indication of detection of the oscillator output signal frequency.

7. The apparatus of claim 1 or 2 and further comprising a detector for receiving a signal representative of leakage from the communication circuit, for extracting from the signal representative of leakage signals in the AGC bandwidth, and for producing an indication of detection of signals in the AGC bandwidth.

8. A communication method comprising the steps of providing at least one source of program material, at least one carrier frequency signal source, modulating the at least one carrier frequency signal source with the at least one program material source in at least one first modulator, demodulating program material-modulated carrier frequency signals in at least one terminal apparatus, providing the at least one first modulator with a first input terminal, a second input terminal and a first output terminal, providing the at least one terminal apparatus with automatic gain control (AGC) means having an AGC bandwidth, coupling the at least one program material source to the at least one first input terminal through at least one first means, coupling the at least one carrier frequency signal source to the at least one second input terminal through at least one second means, coupling the at least one first output terminal to the at least one terminal apparatus through at least one third means, the at least one first coupling means comprising a second modulator, providing on the second modulator a third input terminal, a fourth input terminal and a second output terminal, providing a source of signals having a frequency in the AGC bandwidth, coupling the source of signals in the AGC bandwidth to the third input terminal, coupling the at least one source of program material to the fourth input terminal, and coupling the second output terminal to the first input terminal.

9. A communication method comprising the steps of providing at least one source of program material, at least one carrier frequency signal source, modulating the at least one carrier frequency signal source with the at least one program material source in at least one first modulator, demodulating program material-modulated carrier frequency signals in at least one terminal apparatus, providing the at least one first modulator with a first input terminal, a second input terminal and a first output terminal, providing the at least one terminal apparatus with automatic gain control (AGC) means having an AGC bandwidth, coupling the at least one program material source to the at least one first input terminal through at least one first means, coupling the at least one carrier frequency signal source to the at least one second input terminal through at least one second means, coupling the at least one first output terminal to the at least one terminal apparatus through at least one third means, the at least one second coupling means comprising a second modulator providing on the second modulator a third input terminal, a fourth input terminal and a second output terminal, providing a source of signals having a frequency in the AGC bandwidth, coupling the source of signals in the AGC bandwidth to the third input terminal, coupling the at least one carrier frequency signal source to the fourth input terminal, and coupling the second output terminal to the second input terminal.

10. The method of claim 8 or 9 wherein the step of providing a source of signals having a frequency in the AGC bandwidth comprises providing an oscillator having an output signal frequency less than about 35 Hz.

11. The method of claim 10 and further comprising receiving a signal representative of leakage from the communication circuit, extracting from the signal representative of leakage the oscillator output signal frequency, and producing an indication of detection of the oscillator output signal frequency.

12. The method of claim 10 wherein the step of providing an oscillator having an output signal frequency less than about 35 Hz comprises providing an oscillator having an output signal frequency in the range of from about 3 Hz to about 15 Hz.

13. The method of claim 12 and further comprising receiving a signal representative of leakage from the communication circuit, extracting from the signal representative of leakage the oscillator output signal frequency, and producing an indication of detection of the oscillator output signal frequency.

14. The method of claim 8 or 9 and further comprising receiving a signal representative of leakage from the communication circuit, extracting from the signal representative of leakage signals in the AGC bandwidth, and producing an indication of detection of signals in the AGC bandwidth.

15. A communication circuit comprising n sources of program material, where n is an integer, n+1 carrier frequency modulators, n+1 sources of carrier frequency signals, each of the n program material sources and n of the n+1 carrier frequency signals being coupled to carrier frequency modulators, the n program material sources thereby modulating n of the carrier frequency signals to provide n output signals, terminal apparatus for recovering the program material selectively from the output signals, the terminal apparatus including automatic gain control (AGC) means having an AGC bandwidth, and an oscillator having a frequency in the AGC bandwidth, the oscillator and the (n+1)st carrier frequency being coupled to the (n+1)st carrier frequency modulator to modulate the (n+1)st carrier frequency by the oscillator frequency, and a detector for receiving a signal representative of leakage of the thus-modulated (n+1)st carrier frequency from the circuit, for detecting the oscillator output frequency in the received signal, and for producing an indication of detection of the oscillator output frequency.

16. The apparatus of claim 15 wherein the oscillator output frequency is less than about 35 Hz.

17. The apparatus of claim 16 wherein the oscillator output frequency is in the range of from about 3 Hz to about 15 Hz.

18. The apparatus of claim 15, 16 or 17 wherein the communication circuit comprises a CATV circuit and the terminal apparatus comprises at least one television receiver.

19. In a communication circuit, a method comprising the steps of providing n sources of program material, where n is an integer, n+1 carrier frequency modulators, n+1 sources of carrier frequency signals, coupling each of the n program material sources and n of the n+1 carrier frequency signals to carrier frequency modulators, thereby modulating n of the carrier frequency signals with the n program material sources to provide n output signals, recovering the program material selectively from the output signals with terminal apparatus including automatic gain control (AGC) means having an AGC bandwidth, coupling an oscillator having a frequency in the AGC bandwidth and the (n+1)st carrier frequency to the (n+1)st carrier frequency modulator to modulate the (n+1)st carrier frequency by the oscillator frequency, receiving a signal representative of leakage of the thus-modulated (n+1)st carrier frequency from the circuit, detecting the oscillator output frequency in the received signal, and producing an indication of detection of the oscillator output frequency.

20. The method of claim 19 wherein coupling an oscillator having a frequency in the AGC bandwidth to the (n+1)st carrier frequency modulator comprises coupling an oscillator having a frequency less than about 35 Hz to the (n+1)st carrier frequency modulator.

21. The method of claim 20 wherein coupling an oscillator having a frequency in the AGC bandwidth to the (n+1)st carrier frequency modulator comprises coupling an oscillator having a frequency in the range of from about 3 Hz to about 15 Hz to the (n+1)st carrier frequency modulator.

22. The method of claim 19, 20 or 21 wherein recovering the program material selectively from the output signals with terminal apparatus including AGC means comprises recovering the program material with at least one television receiver.

* * * * *